(12) United States Patent
Takahashi et al.

(10) Patent No.: US 9,045,372 B2
(45) Date of Patent: Jun. 2, 2015

(54) HONEYCOMB STRUCTURE BODY

(71) Applicant: NGK Insulators Ltd., Nagoya (JP)

(72) Inventors: Nobuaki Takahashi, Nagoya (JP); Suguru Kodama, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/958,778

(22) Filed: Aug. 5, 2013

(65) Prior Publication Data

US 2013/0316130 A1 Nov. 28, 2013

Related U.S. Application Data

(63) Continuation of application No. PCT/JP2013/054625, filed on Feb. 22, 2013.

(30) Foreign Application Priority Data

Feb. 24, 2012 (JP) ................................. 2012-039254

(51) Int. Cl.
| | |
|---|---|
| *C04B 28/24* | (2006.01) |
| *C04B 38/06* | (2006.01) |
| *B01D 46/24* | (2006.01) |
| *C04B 38/00* | (2006.01) |
| *F01N 3/022* | (2006.01) |
| *C04B 35/573* | (2006.01) |

(Continued)

(52) U.S. Cl.
CPC ..... *C04B 38/0009* (2013.01); *Y10T 428/24149* (2015.01); *C04B 38/0051* (2013.01); *B01D 46/2448* (2013.01); *F01N 3/0222* (2013.01); *F01N 2330/06* (2013.01); *F01N 2330/60* (2013.01); *Y02T 10/20* (2013.01); *B01D 46/2429* (2013.01); *B01D 2046/2437* (2013.01); *C04B 35/573* (2013.01); *C04B 35/636* (2013.01); *C04B 35/6365* (2013.01); *C04B 37/005* (2013.01); *C04B 38/0019* (2013.01); *C04B 2111/00793* (2013.01);

(Continued)

(58) Field of Classification Search
None
See application file for complete search history.

(56) References Cited

U.S. PATENT DOCUMENTS

2002/0197193 A1 12/2002 Harada et al.
2003/0165662 A1* 9/2003 Suwabe et al. ................ 428/116

(Continued)

FOREIGN PATENT DOCUMENTS

EP 2123617 A1 * 11/2009
JP 3889194 3/2007

(Continued)

OTHER PUBLICATIONS

International Search Report, International Application No. PCT/JP2013/054625, dated Apr. 16, 2013 (6 pages).

*Primary Examiner* — David Sample
*Assistant Examiner* — Nicholas W Jordan
(74) *Attorney, Agent, or Firm* — Burr & Brown, PLLC

(57) ABSTRACT

A honeycomb structure body having joining material layers of a stress relaxing function and joining strength equivalent to those of joining material layers of a conventional honeycomb structure body, and having an excellent heat shock resistance. A honeycomb structure body includes a plurality of honeycomb segments and joining material layers having a plurality of pores and joining the plurality of honeycomb segments in a state where the honeycomb segments are arranged adjacent to each other so that side surfaces of the honeycomb segments face each other. A ratio of the number of pores having a value of 1.2 or less which is obtained by dividing a maximum diameter of each of the pores by a minimum diameter of the each of the pores is 60% or more of the number of all the pores of each of the joining material layers.

16 Claims, 3 Drawing Sheets

(51) Int. Cl.
*C04B 35/636* (2006.01)
*C04B 37/00* (2006.01)
*C04B 111/00* (2006.01)

(52) U.S. Cl.
CPC .. *C04B 2235/3418* (2013.01); *C04B 2235/428* (2013.01); *C04B 2235/5228* (2013.01); *C04B 2235/5296* (2013.01); *C04B 2235/5436* (2013.01); *C04B 2237/062* (2013.01); *C04B 2237/064* (2013.01); *C04B 2237/066* (2013.01); *C04B 2237/068* (2013.01); *C04B 2237/083* (2013.01); *C04B 2237/365* (2013.01)

(56) References Cited

U.S. PATENT DOCUMENTS

| | | |
|---|---|---|
| 2005/0272602 A1 | 12/2005 | Ninomiya |
| 2006/0216466 A1 | 9/2006 | Yoshida |
| 2008/0138568 A1* | 6/2008 | Tomita et al. ................ 428/116 |
| 2009/0004431 A1 | 1/2009 | Ninomiya |
| 2009/0011178 A1 | 1/2009 | Masukawa et al. |
| 2009/0022943 A1 | 1/2009 | Tomita et al. |
| 2009/0029104 A1* | 1/2009 | Iwata et al. ................... 428/116 |
| 2009/0191378 A1 | 7/2009 | Ohno et al. |
| 2009/0202779 A1 | 8/2009 | Yoshida |

FOREIGN PATENT DOCUMENTS

| | | |
|---|---|---|
| JP | 4392984 | 1/2010 |
| JP | 2010-24073 | 2/2010 |
| JP | 4592695 | 12/2010 |
| WO | 2006/103786 | 10/2006 |
| WO | 2007/111279 | 10/2007 |
| WO | 2007/119407 | 10/2007 |
| WO | 2009/095982 | 8/2009 |

* cited by examiner

HONEYCOMB STRUCTURE BODY

BACKGROUND OF THE INVENTION

1. Technical Field

The present invention relates to a honeycomb structure body. More particularly, the present invention relates to a honeycomb structure body having joining material layers of a stress relaxing function and joining strength equivalent to those of joining material layers of a conventional honeycomb structure body, and having an excellent heat shock resistance.

2. Description of Related Art

As a collecting filter for an exhaust gas, for example, a diesel particulate filter (DPF) to trap and remove a particulate matter (particulates) included in an exhaust gas from a diesel engine or the like, a honeycomb structure body has broadly been used.

Such a honeycomb structure body has, for example, a structure in which a plurality of cells formed by porous partition walls made of silicon carbide (SiC) or the like to become through channels of a fluid are arranged in parallel with one another in a central axis direction. Moreover, end portions of the adjacent cells are plugged alternately (in a checkered pattern). That is, in one of the cells, one end portion is open, and the other end portion is plugged. Furthermore, in the other cell adjacent to the one cell, one end portion is plugged, and the other end portion is open.

According to such a structure, the exhaust gas can be purified as follows. First, the exhaust gas is allowed to flow into a predetermined cell (an inflow cell) from the one end portion of the cell. In this case, the above exhaust gas passes through the porous partition wall. Moreover, when the exhaust gas passes through the partition wall, the particulate matter (the particulates) in the exhaust gas is trapped by the partition wall. Therefore, the purified exhaust gas is discharged through the cell (an outflow cell) adjacent to the inflow cell.

For the purpose of using such a honeycomb structure body (the filter) continuously for a long period of time, it is necessary to periodically subject the filter to a regeneration treatment. That is, in the filter, the particulates are deposited with an elapse of time. Therefore, for the purpose of returning a filter performance to an initial state, i.e., decreasing a pressure loss which has increased due to the particulates, it is necessary to burn and remove the particulates deposited in the filter. However, at the regeneration of this filter, a large heat stress (hereinafter referred to simply as "the stress" sometimes) takes place in the filter, and hence this heat stress disadvantageously generates defects such as cracks or breakdowns in the honeycomb structure body. Consequently, to solve the above problem due to this heat stress (in other words, to meet a demand for enhancement of a heat shock resistance), there have been suggested honeycomb structure bodies having a divided structure in which a plurality of honeycomb segments are integrally joined by a joining material layer (see Patent Documents 1 to 4). The above honeycomb structure bodies have such a divided structure, and are therefore provided with a function of dissipating and relaxing the heat stress. Moreover, according to such honeycomb structure bodies, the heat shock resistance can be improved to a certain degree.

CITATION LIST

Patent Documents

[Patent Document 1] JP 4392984
[Patent Document 2] JP 3889194
[Patent Document 3] JP 4592695
[Patent Document 4] WO 2006/103786

SUMMARY OF THE INVENTION

Problem to be Solved by the Invention

In recent years, however, there has been a further increasing demand for enlargement of a filter. Consequently, a heat stress which takes place at regeneration has increased. Therefore, to solve the above-mentioned problems, further enhancement of a heat shock resistance of the filter as a structure body is strongly demanded. In consequence, to realize the further enhancement of the heat shock resistance, a joining material layer which integrally joins a plurality of honeycomb segments has been required to have an excellent stress relaxing function and joining strength. Thus, in recent years, development of a honeycomb structure body having a further enhanced heat shock resistance has earnestly been demanded.

The present invention has been developed in view of such problems of the conventional technologies. An object of the invention is to provide a honeycomb structure body having joining material layers of a stress relaxing function and joining strength equivalent to those of joining material layers of a conventional honeycomb structure body, and having an excellent heat shock resistance.

Means for Solving the Problem

According to the present invention, there is provided a honeycomb structure body described hereinafter.

[1] A honeycomb structure body including: a plurality of honeycomb segments having porous partition walls with which a plurality of cells extending from one end surface to the other end surface to become through channels of a fluid are formed, and an outer peripheral wall positioned at the outermost periphery and disposed to surround the partition walls, and having plugged portions arranged in one end portion of each of predetermined cells and the other end portion of each of the remaining cells; and joining material layers having a plurality of pores and joining the plurality of honeycomb segments in a state where the honeycomb segments are arranged adjacent to each other so that side surfaces of the honeycomb segments face each other, wherein a ratio of the number of pores having a value of 1.2 or less which is obtained by dividing a maximum diameter of each of the pores by a minimum diameter of the each of the pores is 60% or more of the number of all the pores of each of the joining material layers.

[2] The honeycomb structure body according to the above [1], wherein when the one honeycomb segment among the plurality of honeycomb segments is a honeycomb segment A, the other honeycomb segment is a honeycomb segment B and the joining material layer joining the honeycomb segment A and the honeycomb segment B is divided into three layers constituted of a first layer, a second layer and a third layer at a thickness ratio of 1:2:1 in order from the side of the honeycomb segment A, a relation of $0.9<P2/P1<1.2$ is satisfied, in which $P1$ is an average porosity of the first layer and the third layer, and $P2$ is a porosity of the second layer.

[3] The honeycomb structure body according to the above [1] or [2], wherein a porosity of the whole joining material layer is from 45 to 75%.

[4] The honeycomb structure body according to any one of the above [1] to [3], wherein an average pore diameter of the joining material layer is from 20 to 50 µm.

[5] The honeycomb structure body according to any one of the above [1] to [4], wherein the joining material layer contains at least one selected from a group consisting of silicon carbide, cordierite, alumina, zirconia, and yttria.

[6] The honeycomb structure body according to any one of the above [1] to [5], wherein a compressive Young's modulus of the joining material layer in a thickness direction is from 15 to 80 MPa, and a bending strength is from 0.8 to 3.0 MPa.

Effect of the Invention

A honeycomb structure body of the present invention includes a plurality of honeycomb segments, and joining material layers which join the plurality of honeycomb segments, and a ratio of the number of pores having a value of 1.2 or less which is obtained by dividing a maximum diameter of each of the pores by a minimum diameter of the each of the pores is 60% or more of the number of all the pores of each of the joining material layers. When the ratio of the number of the pores having the value of 1.2 or less which is obtained by dividing the maximum diameter by the minimum diameter is 60% or more of the number of all the pores as described above, it is possible to obtain the joining material layers in which a stress relaxing function is compatible with a joining strength. Moreover, the honeycomb structure body including these joining material layers has a heat shock resistance more excellent than that of a conventional honeycomb structure body, even when a material similar to a material constituting joining material layers of the conventional honeycomb structure body is used. That is, the honeycomb structure body of the present invention, including the joining material layers of the stress relaxing function and joining strength equivalent to those of the joining material layers of the conventional honeycomb structure body, has the excellent heat shock resistance.

DETAILED DESCRIPTION OF THE INVENTION

Hereinafter, embodiments of the present invention will be described. It should be understood that the present invention is not limited to the following embodiments and that suitable modifications, improvements and the like added to the following embodiments on the basis of ordinary knowledge of a person skilled in the art without departing from the gist of the present invention also fall in the gist of the present invention.

Figure 1:
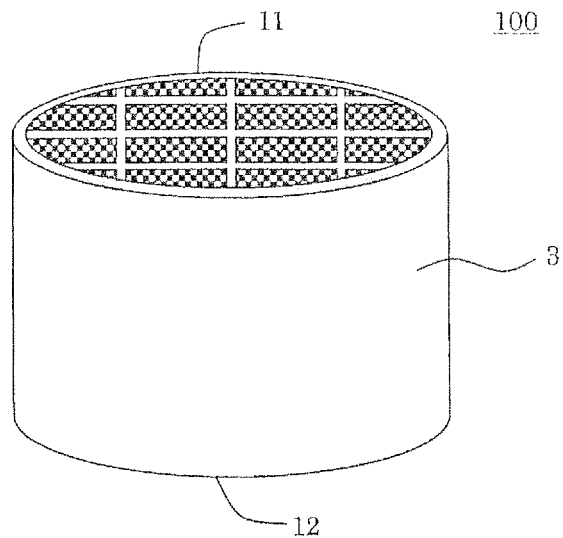
FIG. 1 is a perspective view schematically showing one embodiment of a honeycomb structure body of the present invention.
Figure 2:
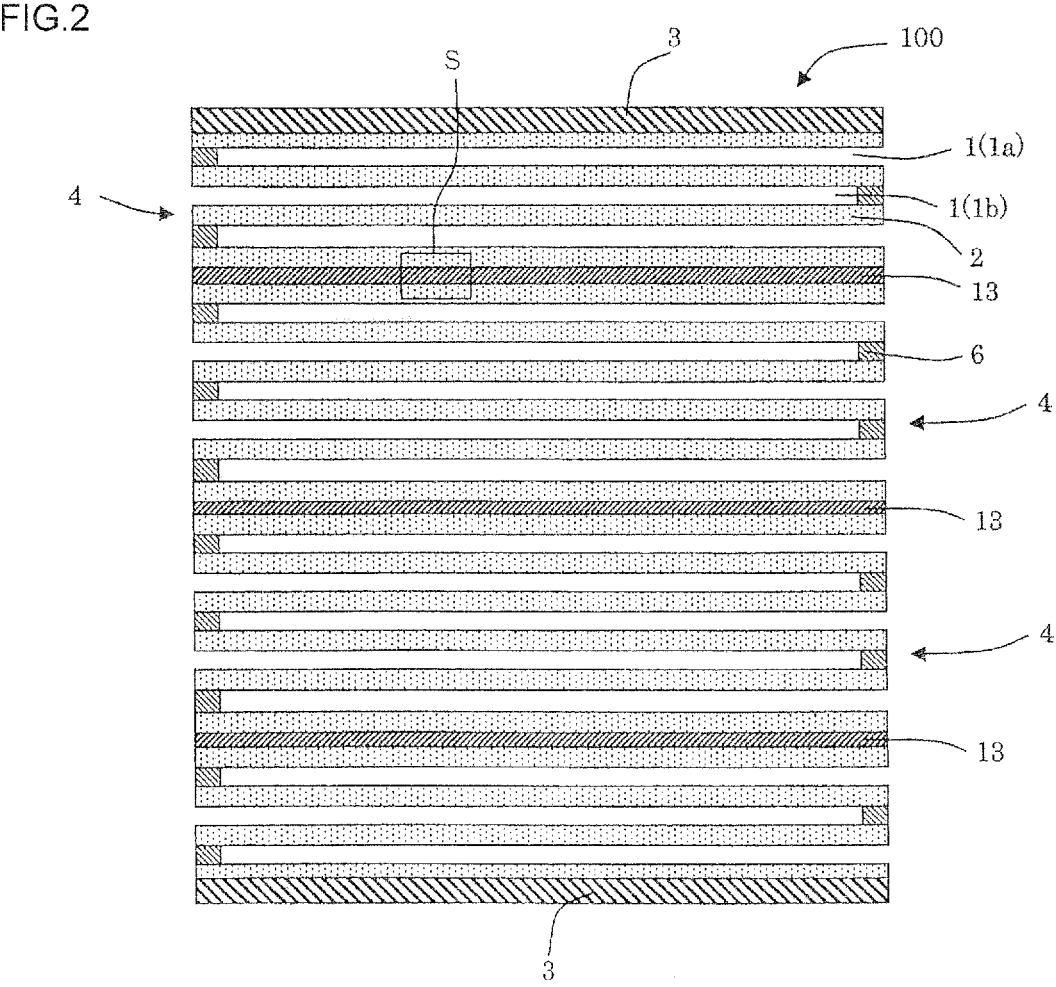
FIG. 2 is a cross-sectional view schematically showing a cross section of the honeycomb structure body shown in FIG. 1 which is parallel to a central axis of the honeycomb structure body.

[1] Honeycomb Structure Body:

One embodiment of a honeycomb structure body of the present invention includes, as in a honeycomb structure body 100 shown in FIG. 1 and FIG. 2, a plurality of honeycomb segments 4, and joining material layers 13 where a ratio of the number of pores having a value of 1.2 or less which is obtained by dividing a maximum diameter L1 by a minimum diameter L2 is 60% or more of the number of all pores. "The plurality of honeycomb segments 4" have porous partition walls 2 and an outer peripheral wall 3 positioned at the outermost periphery and disposed to surround the partition walls 2, and also have plugged portions 6. With "the partition walls 2", a plurality of cells 1 extending from one end surface 11 to the other end surface 12 to become through channels of a fluid are formed. "The plugged portions 6" are arranged in one end portion of a predetermined cell 1 (1a) and the other end portion of the remaining cell 1 (1b). "The joining material layers 13" have the plurality of pores, and join the plurality of honeycomb segments 4 in a state where the honeycomb segments 4 are arranged adjacent to each other so that side surfaces of the honeycomb segments face each other. It is to be noted that hereinafter "pores having a value of 1.2 or less which is obtained by dividing the maximum diameter L1 of each of the pores by the minimum diameter L2 of the each of the pores" will be referred to as "spherical pores" sometimes.

The honeycomb structure body 100 includes the joining material layer 13 where the ratio of the number of pores having a value of 1.2 or less which is obtained by dividing the maximum diameter L1 of each of the pores by the minimum diameter L2 of the each of the pores is 60% or more of the number of all the pores. In the joining material layers 13, the ratio of the number of the spherical pores is 60% or more of the number of all the pores, and hence a stress relaxing function is compatible with a joining strength. Therefore, the honeycomb structure body 100 including the joining material layers 13 has a heat shock resistance more excellent than that of a conventional honeycomb structure body, even when a material similar to a material constituting joining material layers of the conventional honeycomb structure body is used. That is, the honeycomb structure body 100, including the joining material layers of the stress relaxing function (the function of relaxing a heat stress) and the joining strength equivalent to those of the joining material layers of the conventional honeycomb structure body, has the excellent heat shock resistance.

FIG. 1 is a perspective view schematically showing the one embodiment of the honeycomb structure body of the present invention. FIG. 2 is a cross-sectional view schematically showing a cross section of the honeycomb structure body shown in FIG. 1 which is parallel to a central axis of the honeycomb structure body.

Figure 3:
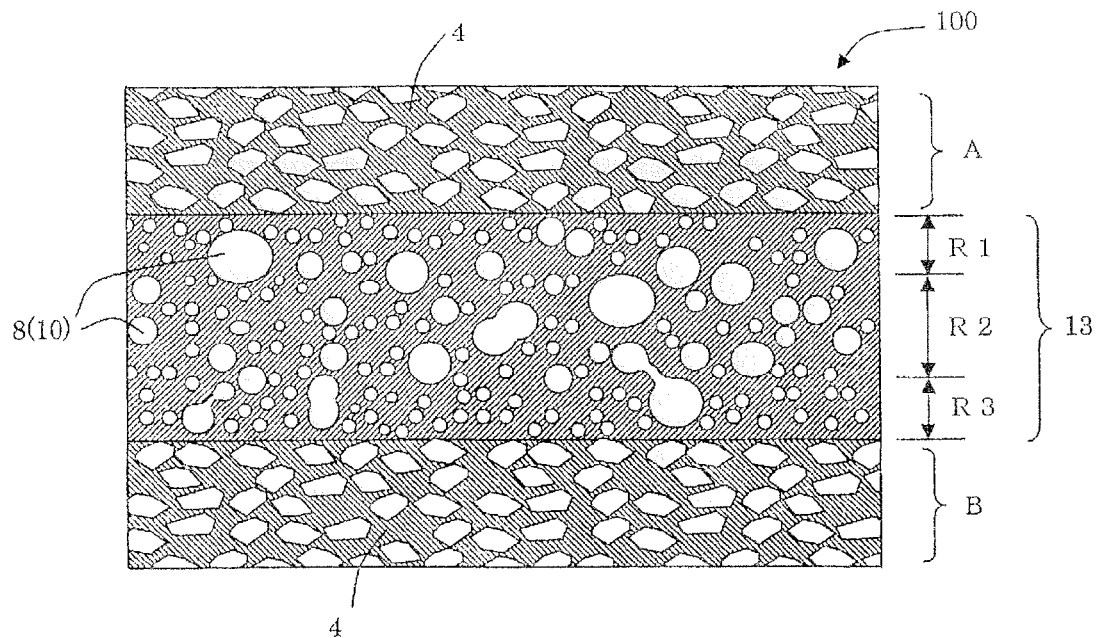
FIG. 3 is a cross-sectional view schematically showing an enlarged region S shown in FIG. 2.

[1-1] Joining Material Layer:

As shown in FIG. 2 and FIG. 3, the joining material layers 13 join the plurality of honeycomb segments 4 in a state where the honeycomb segments 4 are arranged adjacent to each other so that side surfaces of these honeycomb segments face each other. Moreover, in each of the joining material layers 13, a plurality of pores 8 are formed. FIG. 3 is a cross-sectional view schematically showing an enlarged region S shown in FIG. 2.

More specifically, spherical pores 10 are the pores having a value of 1.2 or less which is calculated in accordance with a formula (a maximum diameter/a minimum diameter), in which "the maximum diameter" is the longest straight line and "the minimum diameter" is the shortest line among straight lines each passing through a gravity center of each of the pores and connecting two points on a circumference of the pore. The above value is preferably 1.15 or less, and further preferably 1.1 or less.

Here, in the joining material layers, there are formed cavities (including "the pores") observed as closed regions in a cross section of the joining material layer in a thickness direction. Examples of the cavity include cavities having the following shapes in the cross section of the joining material layer in the thickness direction. That is, examples of the cavity include cavities having a round shape, a schematically round shape, an elliptic shape, a schematically elliptic shape, and a polygonal shape having a chamfered corner portion. Moreover, another example of the cavity is a cavity (a connected cavity) having a shape formed by connecting a plurality of regions having the round shape, the schematically round shape, the elliptic shape, the schematically elliptic shape, and the polygonal shape having the chamfered corner portion. A further example of the cavity is a cavity (an overlapped cavity) having a shape formed by mutually overlapping the round shape, the schematically round shape, the elliptic shape, the schematically elliptic shape, and the polygonal shape having the chamfered corner portion. According to the present invention, in principle, the cavities correspond to "the pores" (one cavity corresponds to one pore), but in the above connected cavity and the overlapped cavity, a part of the cavity is regarded as one pore sometimes. Specifically, it is considered that in the case of the above connected cavity, a portion (a region) having a width of 30 µm or less is not present among portions (necked portions of the cavity) connecting a plurality of regions (e.g., regions C, D and E (see FIG. 5)). Furthermore, it is considered that in the case of the above overlapped cavity, another closed region including, as a boundary line, "a line segment having a width of 30 µm or less" drawn in the above "necked portion" is present, when the width of the necked portion of the cavity is 30 µm or less. Thus, the cavity is divided by "the region considered not to be present" or "the line segment having a width of 30 µm or less", and hence a part (a predetermined region) of the divided cavity is regarded as "the pore" as long as the part has a predetermined size (50 µm² or more).

Figure 4:
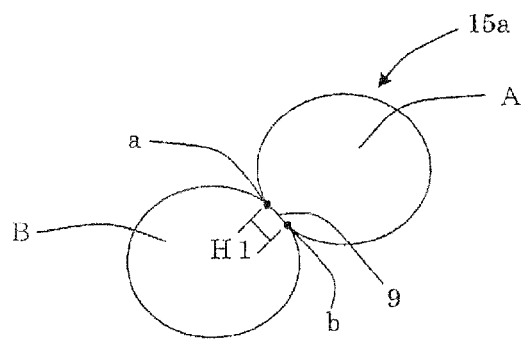
FIG. 4 is a schematic view showing enlarged pores in the region S shown in FIG. 2.
Figure 5:
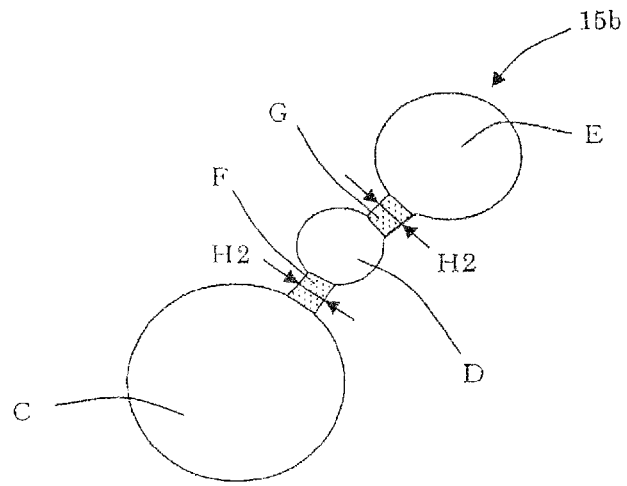
FIG. 5 is a schematic view showing enlarged pores in the region S shown in FIG. 2.

Specifically, an example of the above overlapped cavity is a cavity 15a shown in FIG. 4. Moreover, an example of the above connected cavity is a cavity 15b shown in FIG. 5. The cavity 15a shown in FIG. 4 is an example where two round shapes overlap with each other to form a shape, and a width H1 of the necked portion is 30 µm or less. The width H1 of the necked portion is a length of a line segment 9 connecting two points a and b closest to a contour edge of the necked portion. It is considered that in the cavity 15a, another closed region including the line segment 9 as a boundary line is present. Therefore, it is considered that in the cavity 15a, two separate pores A of regions A and B are present. Moreover, the cavity 15b shown in FIG. 5 is an example showing a cavity constituted of three round regions C, D and E, and regions (necked portions) F and G connecting the adjacent regions C, D and E to one another and having a maximum width H2 of 30 µm or less. It is considered that in the cavity 15b, each of the regions F and G has a width of 30 µm or less, and hence the regions F and G are not present. Therefore, it is considered that in the cavity 15b, three separate pores of the regions C, D and E are present. FIG. 4 is a schematic view showing enlarged pores in the region S shown in FIG. 2, and FIG. 5 is a schematic view showing enlarged pores in the region S shown in FIG. 2.

In the present description, an area of "the pore" which is observed in the cross section of the joining material layer in the thickness direction is 50 µm² or more.

Moreover, the ratio of the number of the spherical pores 10 needs to be 60% or more of the number of all the pores 8, and is preferably from 65 to 100%, further preferably from 70 to 100%, and especially preferably from 80 to 100%. The above ratio of the number of the spherical pores 10 is 60% or more of the number of all the pores 8, thereby making it possible to obtain the joining material layer in which the stress relaxing function is compatible with the joining strength. When the above ratio of the number of the spherical pores 10 is smaller than 60% of the number of all the pores 8, a large number of flat pores are present, thereby easily causing stress concentration around small inner angle portions of the flat pores. Moreover, when the above stress concentration takes place, the joining strength in the joining material layer becomes insufficient. Therefore, the compatibility between the stress relaxing function and the joining strength cannot be obtained, and the honeycomb structure body having an excellent heat shock resistance cannot be obtained. It is to be noted that whether or not the pore is "the spherical pore" is determined by whether or not the value obtained by dividing the maximum diameter L1 by the minimum diameter L2 is 1.2 or less as described above. Specifically, the above determination is performed in an observation view field obtained at an observation magnification of 200 to 250 times by use of a scanning type electron microscope (SEM). In the present description, "the observation view field" is a view field including the whole joining material layer in the thickness direction. In other words, "the observation view field" is a view field including one surface (the surface on the side of the one honeycomb segment) and the other surface (the surface on the side of the other honeycomb segment) of the joining material layer.

An average value of the maximum diameter L1 and the minimum diameter L2 of the spherical pore 10 (i.e., an average diameter of the spherical pore 10) is preferably from 25 to 55 µm, further preferably from 30 to 50 µm, and especially preferably from 35 to 45 µm. Furthermore, the number of the spherical pores 10 per observation view field of 1 mm² in the cross section of the joining material layer in the thickness direction (the spherical pores/mm²) is preferably from 80 to 200 spherical pores/mm², further preferably from 110 to 180 spherical pores/mm², and especially preferably from 140 to 160 spherical pores/mm².

The honeycomb structure body 100 preferably satisfies the following relational formula. Here, as shown in FIG. 3, one honeycomb segment among the plurality of honeycomb segments 4 is regarded as a honeycomb segment A. Moreover, the other honeycomb segment is regarded as a honeycomb segment B. Furthermore, the joining material layer 13 joining the honeycomb segment A and the honeycomb segment B is divided into three layers constituted of a first layer R1, a second layer R2 and a third layer R3 at a thickness ratio of 1:2:1 in order from the side of the honeycomb segment A. In such cases, the honeycomb structure body 100 preferably satisfies a relation of 0.90<P2/P1<1.20, further preferably satisfies a relation of 0.95<P2/P1<1.15, and especially preferably satisfies a relation of 1.00<P2/P1<1.10. It is to be noted that in the above relational formula, P1 is an average porosity P1 of the first layer R1 and the third layer R3, and P2 is a porosity P2 of the second layer R2.

When the porosity P1 and the porosity P2 satisfy the above relation, it is meant that the pores are evenly present in the whole joining material layer. With the pores evenly distributed in this manner, a compressive Young's modulus of the joining material layer in the thickness direction is decreased, and the stress relaxing function of the honeycomb structure body further enhances while the stress relaxing function is compatible with the joining strength.

A porosity of the whole joining material layer is preferably from 45 to 75%, further preferably from 50 to 70%, and especially preferably from 55 to 65%. When the above porosity is in the above range, the compressive Young's modulus decreases, and a suitable stress relaxing function is developed. Therefore, the honeycomb structure body having a further excellent heat shock resistance can be obtained. It is to be noted that the stress relaxing function suitably develops as the compressive Young's modulus decreases. The porosity of the whole joining material layer is the porosity of the whole joining material layer constituted of all the first, second and third layers. Specifically, the porosity is a value measured by Archimedes method using a test piece of the joining material layer cut from the honeycomb structure body. It is to be noted that the above test piece is constituted of all the first, second and third layers. In other words, one surface originates from the one surface of the joining material layer (the surface on the side of the one honeycomb segment), and the other surface originates from the other surface of the joining material layer (the surface on the side of the other honeycomb segment). Additionally, porosities of three layers (the first layer, the second layer, and the third layer) constituting the joining material layer are values calculated by image processing described later.

An average pore diameter of the joining material layer is preferably from 20 to 50 μm, further preferably from 25 to 45 μm, and especially preferably from 30 to 40 μm. When the above average pore diameter is in the above range, the compressive Young's modulus decreases, and the suitable stress relaxing function is developed. Consequently, the honeycomb structure body having a further excellent heat shock resistance can be obtained. The average pore diameter of the joining material layer is a value calculated by the image processing of an electron microphotograph in a cross section of the joining material layer which is perpendicular to the thickness direction of the joining material layer.

In the honeycomb structure body 100, the compressive Young's modulus of the joining material layer 13 in the thickness direction is preferably from 15 to 80 MPa, further preferably from 20 to 60 MPa, and especially preferably from 30 to 50 MPa. When the above compressive Young's modulus is in the above range, the stress relaxing function can sufficiently be exerted. Therefore, the honeycomb structure body having a further excellent heat shock resistance can be obtained, and in this honeycomb structure body, cracks are not easily generated.

It is to be noted that in the present description, "the compressive Young's modulus of the joining material layer in the thickness direction" is a value calculated as follows. First, the joining material layer is cut from the honeycomb structure body to obtain a test piece, and a compressive load is applied to this test piece so that a compressive stress is from 1 to 2 MPa in the thickness direction. Afterward, displacements of the test piece before and after the application of the compressive load (change amounts (mm) of a sample thickness) are measured to prepare "a stress-strain diagram". Afterward, a tilt of "a stress-strain line" in the above "stress-strain diagram" is calculated in accordance with the following equation (1). A calculated value is the compressive Young's modulus.

[Equation 1]

$$E = \frac{W}{S} \times \frac{t}{\Delta T} \quad (1)$$

(In the above equation (1), E is the compressive Young's modulus (MPa), W is the compressive load (N), S is a sample area (i.e., an area of a surface to which the compressive load is directly applied in the test piece) (mm$^2$), t is the sample thickness (the thickness of the test piece in a load direction) (mm), and ΔT is the change amount (mm) of the sample thickness.)

Moreover, in the honeycomb structure body 100, a bending strength is preferably from 0.8 to 3.0 MPa, further preferably from 1.2 to 2.5 MPa, and especially preferably from 1.5 to 2.0 MPa. When the above bending strength is in the above range, it is possible to prevent the generation of the cracks in the joining material layer due to the heat stress. Furthermore, a force with which the joining material layer binds the honeycomb segments is not excessively strong (i.e., the joining material layer can appropriately be deformed). Therefore, at the generation of the heat stress, the cracks are not easily generated in the honeycomb segments.

Figure 6:
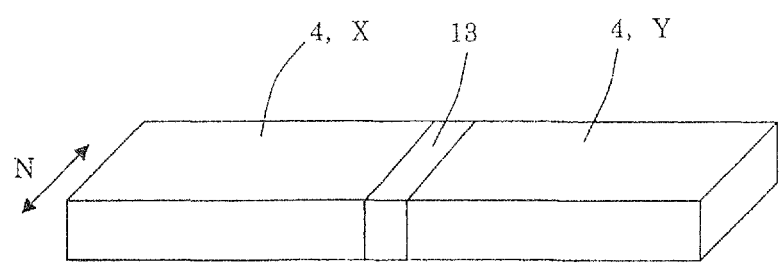
FIG. 6 is a perspective view schematically showing a test piece cut from the honeycomb structure body.
Figure 7:
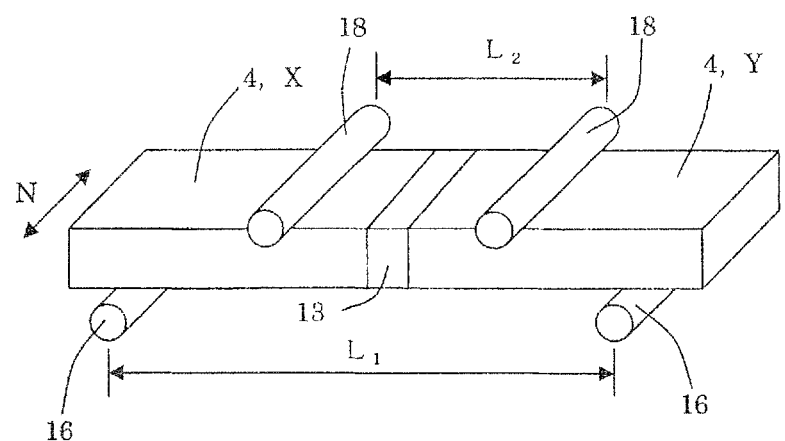
FIG. 7 is a perspective view for explaining a four-point bending test.

"The bending strength" is a value measured in a four-point bending test which conforms to the joining bending test of JIS R 1624. Specifically, first, as shown in FIG. 6, one honeycomb segment among a plurality of honeycomb segments is defined as a honeycomb segment X, and the other honeycomb segment adjacent to the honeycomb segment X is defined as a honeycomb segment Y. At this time, the joining material layer 13 joining the honeycomb segment X and the honeycomb segment Y is cut out as the test piece together with a part of the honeycomb segment X and a part of the honeycomb segment Y. Next, as shown in FIG. 7, in the test piece, two supporting points 16 and 16 and two loading points 18 and 18 are arranged. Next, at the loading points, external forces are applied to the test piece. The test is carried out as described above to measure "the bending strength". FIG. 6 is a perspective view schematically showing the test piece cut from the honeycomb structure body. FIG. 7 is a perspective view for explaining the four-point bending test.

For the joining material layer 13, a material similar to a joining material layer of a heretofore known honeycomb structure body can suitably be selected and used. Specifically, examples of the material include silicon carbide, cordierite, alumina, zirconia, yttria, mullite, aluminum silicate, silicon, and a silicon-silicon carbide composite material. Among these materials, at least one selected from a group consisting of silicon carbide, cordierite, alumina, zirconia, and yttria is preferably contained. With the at least one selected from the group consisting of these compounds being contained, sufficient heat resisting properties of the joining material layer of the honeycomb structure body can be obtained.

A thickness of the joining material layer 13 can be determined in consideration of a joining force between the honeycomb segments 4. The thickness of the joining material layer 13 can be, for example, in a range of 0.5 to 3.0 mm.

[1-2] Honeycomb Segment:

The honeycomb segments similar to honeycomb segments of the honeycomb structure body which has heretofore been used as a known diesel particulate filter or the like can suitably be used. The honeycomb segments shown in FIG. 1 have the porous partition walls 2 with which the plurality of cells 1 extending from the one end surface 11 to the other end surface 12 to become the through channels of the fluid are formed, and the plugged portions 6 arranged in the one end portion of each of predetermined cells 1 (1a) and the other end portion of each of the remaining cells 1 (1b). Moreover, in the honeycomb segments shown in FIG. 1, the end portions of the adjacent cells 1 are alternately plugged (in the checkered pattern).

The honeycomb segment 4 is not limited to the honeycomb segment having such a square cross-sectional shape as shown in FIG. 1, and may have a cross-sectional shape such as a triangular shape or a hexagonal shape. Moreover, the cross-sectional shape of the cell 1 may be a shape such as the triangular shape, the hexagonal shape, a round shape, or an elliptic shape.

From the viewpoints of suitable strength and heat resisting properties, an example of a material of the honeycomb segment 4 is as follows. The example is a material constituted of at least one selected from a group consisting of silicon carbide (SiC), a silicon-silicon carbide composite material formed by using silicon carbide (SiC) as an aggregate and using silicon (Si) as a binding agent, silicon nitride, cordierite, mullite, alumina, spinel, a silicon carbide-cordierite composite material, lithium aluminum silicate, aluminum titanate, and Fe—Cr—Al alloy. Above all, the honeycomb segment 4 is preferably made of silicon carbide (SiC) or the silicon-silicon carbide composite material. Moreover, as a charging material to form the plugged portions, a material similar to that of the above honeycomb segment can be used.

[2] Manufacturing Method of Honeycomb Structure Body:

The honeycomb structure body of the present invention can be manufactured as follows. First, a plurality of honeycomb segments having plugged portions are prepared, and joining surfaces (side surfaces) of the respective honeycomb segments are coated with a joining material composition (a joining material composition coating step). The above honeycomb segments have porous partition walls with which a plurality of cells extending from one end surface to the other end surface to become through channels of a fluid are formed, and the plugged portions arranged in one end portion of each of predetermined cells and the other end portion of each of the remaining cells. Next, these honeycomb segments are arranged adjacent to each other so that the side surfaces of the honeycomb segments face each other, and the adjacent honeycomb segments are pressed onto each other, and then heated and dried. In this way, there is prepared a joined honeycomb segment assembly in which the facing side surfaces of the adjacent honeycomb segments are joined by a joining material layer (a joined honeycomb segment assembly preparing step). Next, an outer peripheral portion of this joined segment assembly is formed into a desirable shape (e.g., a columnar shape) by grinding processing, and an outer peripheral surface is coated with a coating material, and then heated and dried to form an outer peripheral wall (an outer peripheral wall forming step). In this way, the honeycomb structure body can be prepared.

[2-1] Joining Material Composition Coating Step:

As the honeycomb segment of the present step, a honeycomb segment prepared by the following method can be used.

First, a binder, a surfactant, a pore former for the segment, water and the like are added to a ceramic raw material to obtain a forming raw material. The ceramic raw material is preferably at least one selected from a group consisting of silicon carbide, a silicon-silicon carbide composite material, cordierite, a cordierite forming raw material, mullite, alumina, spinel, a silicon carbide-cordierite composite material, lithium aluminum silicate, aluminum titanate, and an iron-chromium aluminum alloy. Among these materials, silicon carbide or the silicon-silicon carbide composite material is preferable. When the silicon-silicon carbide composite material is used, a mixture of silicon carbide powder and metal silicon powder is used as the ceramic raw material. A content of the ceramic raw material is preferably from 30 to 90 mass % of the whole forming raw material.

Examples of the binder include methylcellulose, hydroxypropoxyl cellulose, hydroxyethylcellulose, carboxymethylcellulose, and polyvinyl alcohol. Among these binders, methylcellulose and hydroxypropoxyl cellulose are preferably used together. A content of the binder is preferably from 2 to 20 mass % of the whole forming raw material.

A content of the water is preferably from 5 to 50 mass % of the whole forming raw material.

As the surfactant, ethylene glycol, dextrin, fatty acid soap, polyalcohol or the like can be used. These surfactants may be used alone, or a combination of two or more of the surfactants may be used. A content of the surfactant is preferably from 0 to 5 mass % of the whole forming raw material.

There is not any special restriction on the pore former for the segment, when the pores are formed after firing. Examples of the pore former include starch, a resin balloon, a water-absorbing resin, and silica gel. A content of the pore former for the segment is preferably from 0 to 20 mass % of the whole forming raw material.

Next, the forming raw material is kneaded to obtain a kneaded material. There is not any special restriction on a method of kneading the forming raw material to obtain the kneaded material, and an example of the method is a method using a kneader, a vacuum clay kneader or the like.

Next, the kneaded material is extruded to form a plurality of formed honeycomb bodies. During the extrusion forming, a die having a desirable formed honeycomb body shape, cell shape, partition wall thickness, cell density and the like is preferably used. A material of the die is preferably a hard metal which does not easily wear down. Each of the formed honeycomb bodies is a structure having porous partition walls with which a plurality of cells to become through channels of a fluid are formed, and an outer peripheral wall positioned at the outermost periphery.

The partition wall thickness, cell density, outer peripheral portion thickness and the like of the formed honeycomb body can suitably be determined in accordance with a structure of the honeycomb structure body of the present invention which is to be prepared (the structure of the honeycomb segment), in consideration of shrinkage in the drying and firing.

The obtained formed honeycomb bodies are preferably dried before fired. There is not any special restriction on a drying method, and examples of the method include electromagnetic heating systems such as microwave heating drying and high-frequency dielectric heating drying, and external heating systems such as hot air drying and superheat vapor drying. Above all, it is preferable that a predetermined amount of water content is dried by the electromagnetic heating system, and then the remaining water content is dried by the external heating system. This is because the whole formed body can rapidly and evenly be dried so that any cracks are not generated. As drying conditions, it is preferable that a water content of 30 to 90 mass % of the water content prior to the drying is removed by the electromagnetic heating system, and then the water content is decreased by the external heating system down to a water content of 3 mass % or less of the water content prior to the drying. The dielectric heating drying is preferable as the electromagnetic heating system, and the hot air drying is preferable as the external heating system.

Next, when a length of the formed honeycomb body in a central axis direction is not a desirable length, both end surfaces (both end portions) of the body are preferably cut to obtain the desirable length. There is not any special restriction on a cutting method, and an example of the method is a method using a round saw cutter or the like.

Next, the formed honeycomb body is preferably fired to prepare a fired honeycomb body. Removal of the binder and the like is preferably accomplished by performing calcination prior to the firing. The calcination is preferably performed at 400 to 500° C. in the atmospheric air for 0.5 to 20 hours. There is not any special restriction on a calcinating and firing method, and the firing can be performed by using an electric furnace, a gas furnace or the like. As firing conditions, it is preferable that heating is performed at 1300 to 1500° C. in an inert atmosphere of nitrogen, argon or the like for 1 to 20 hours.

Next, one end portion of each predetermined cell in a cross section of the obtained fired honeycomb body which is perpendicular to the central axis and the other end portion of each remaining cell in the cross section perpendicular to the central axis are plugged (plugged portions are formed), to prepare the honeycomb segment. Additionally, it is preferable that the above predetermined cells and the remaining cells are alternately arranged, and in each end surface of the honeycomb segment, a checkered pattern is formed by cell open frontal areas and the plugged portions.

There is not any special restriction on a method of forming the plugged portions, and an example of the method is the following method. A sheet is attached to one end surface of the fired honeycomb body, and then holes are made at positions of the sheet which correspond to the cells to be provided with the plugged portions. Then, the end surface of the fired honeycomb body to which the sheet is attached is immersed in a plugging slurry in which a plugged portion constituent material is slurried. In this way, through the holes made in the sheet, the open frontal areas of the cells which are to be provided with the plugged portions are charged with the plugging slurry. Then, in the other end surface of the fired honeycomb body, plugged portions are formed in the cells which are not provided with any plugged portions in the one end surface by a method similar to the method of forming the plugged portions in the above one end surface (the cells are charged with the plugging slurry). As the constituent material of the plugged portions, the same material as that of the formed honeycomb bodies is preferably used. After forming the plugged portions, firing is preferably performed on conditions similar to the above firing conditions. Moreover, the formation of the plugged portions may be performed prior to the firing of the formed honeycomb bodies.

There is not any special restriction on a method of coating the side surfaces of the fired honeycomb bodies with the joining material composition, and a method such as application by a brush can be used.

As the joining material composition, a composition containing an aggregate having an aspect ratio of 3 or less and a pore former (a pore former for a joining material) having an aspect ratio of 1.5 or less is preferably used. It is to be noted that the aspect ratios of the aggregate and the pore former (the pore former for the joining material) are values measured by using the scanning type electron microscope (SEM). Specifically, 100 or more microphotographs of each of the aggregate and the pore former for the joining material in the joining material composition are taken by the SEM, and long and short diameters of the microphotographed aggregate and pore former for the joining material are measured. Then, an average value of the long diameters and an average value of the short diameters are calculated, respectively. Afterward, a ratio of the average value of the long diameters to the average value of the short diameters is calculated, and the calculated value is the aspect ratio of each of the aggregate and the pore former for the joining material. Coated layers formed by such a joining material composition are fired to become the joining material layers.

Examples of the aggregate include cordierite, alumina, zirconia, yttria, mullite, aluminum silicate, silicon, and a silicon-silicon carbide composite material. Among these aggregates, at least one selected from a group consisting of silicon carbide, cordierite, alumina, zirconia, and yttria is preferably contained.

A content ratio of the aggregate is preferably from 65 to 95 mass %, further preferably from 70 to 90 mass %, and especially preferably from 75 to 85 mass % of the total amount of the joining material composition (a solid content). With the content ratio of the aggregate in the above range, regulation of an amount of the pore former to be added enables the compatibility between the stress relaxing function and the joining strength. Furthermore, the content ratio of the aggregate having an aspect ratio of 3 or less is preferably from 80 to 100 mass %, further preferably from 85 to 100 mass %, and especially preferably from 90 to 100 mass % of the whole aggregate. With the content ratio of the aggregate having the aspect ratio of 3 or less in the above range, movement of the aggregate is suppressed at the firing (the drying) of the coated layers. Therefore, formation of rough and large pores (see FIG. 3) can be suppressed.

As the aggregate, it is preferable to use an aggregate in which a volume content ratio of particles having particle diameters of 50 μm or less is from 85 to 95%, a volume content ratio of particles having particle diameters of 10 μm or less is from 40 to 85%, and a volume content ratio of particles having particle diameters of 2 μm or less is from 10 to 40%. Moreover, it is further preferable to use an aggregate in which the volume content ratio of the particles having the particle diameters of 50 μm or less is from 88 to 92%, the volume content ratio of the particles having the particle diameters of 10 μm or less is from 50 to 75%, and the volume content ratio of the particles having the particle diameters of 2 μm or less is from 20 to 35%. When the aggregate satisfying such conditions is used, aggregate particle sizes are in a broad range. Therefore, drying shrinkages of the coated layers are suppressed, and the pores are evenly distributed.

Examples of the pore former (the pore former for the joining material) include a resin balloon, carbon, a water-absorbing resin, and a fly ash balloon. Among these pore formers, the resin balloon, carbon and the water-absorbing resin are preferable, from the viewpoints that the particle diameters vary comparatively little and that the even pores can be formed in the joining material layers. These pore formers may be used alone, or two or more of the pore formers may be used.

A content ratio of the pore former (the pore former for the joining material) is preferably from 2 to 8 mass %, further preferably from 3 to 7 mass %, and especially preferably from 4 to 6 mass % of the total amount of the joining material composition (a solid content). With the content ratio of the pore former for the joining material in the above range, the joining material layers have a structure in which spherical pores are further evenly dispersed. As a result, the stress relaxation is suitably compatible with the joining strength. Furthermore, the content ratio of the pore former for the joining material having an aspect ratio of 1.5 or less is preferably from 1 to 8 mass %, further preferably from 2 to 6 mass %, and especially preferably from 3 to 5 mass % of the whole pore former for the joining material. With the content ratio of the pore former for the joining material in the above range, a shape of the pores formed in the joining material layers becomes a spherical shape or a shape close to the spherical shape. That is, the joining material layers obtain a structure in which the aggregate is more evenly spread. As a result, a stress is more evenly applied to the joining material layers. In consequence, the joining material layers having a further enhanced stress relaxing function can be obtained.

An average particle diameter of the pore former (the pore former for the joining material) is preferably from 10 to 70 μm, and further preferably from 20 to 60 μm.

The joining material composition can further contain an inorganic fiber as the aggregate.

By containing the inorganic fiber, the joining material layers having an excellent joining strength can be obtained. Therefore, the honeycomb structure body having an excellent heat shock resistance can be prepared. Examples of the inorganic fiber include aluminosilicate fiber, alumina fiber, and magnesium silicate fiber. Moreover, the inorganic fiber does not have to be contained. When the inorganic fiber is not contained, any inorganic fibers that are harmful to humans are not used. Therefore, occurrence of health problems can be avoided.

The joining material composition can further contain an additive such as an organic binder or a dispersant. As the organic binder, a heretofore known organic binder can suitably be selected and used. By this organic binder, the joining material layers having a joining strength equivalent to that of the joining material layers of the conventional honeycomb structure body can be obtained. As the dispersant, a heretofore known dispersant can suitably be selected and used.

Specifically, as the organic binder, carboxymethylcellulose (CMC), methylcellulose, hydroxypropyl methylcellulose or the like can be used. Among these organic binders, carboxymethylcellulose and methylcellulose are preferable. This is because joining properties of the joining material composition become suitable. An amount of the organic binder to be blended to 100 parts by mass of the aggregate is preferably from 1 to 10 parts by mass, and further preferably from 3 to 6 parts by mass. In the above range, the joining material layers having a suitable joining strength can be formed.

The side surfaces of the honeycomb segments can be coated with the joining material composition so that a thickness of each of the joining material layers is in a range of 0.5 to 3.0 mm.

[2-2] Joined Segment Assembly Preparing Step:

In the present step, heating drying conditions after pressing the assembled honeycomb segments can be from 120 to 140° C. and from two to three hours. In this way, there is prepared the joined segment assembly in which the facing side surfaces of the adjacent honeycomb segments are joined to each other by the joining material layer.

[2-3] Outer Peripheral Wall Forming Step:

Next, the outer peripheral portion of the prepared joined segment assembly is formed into a desirable shape (e.g., a columnar shape) by the grinding processing, and the outer peripheral surface is coated with the coating material, and then heated and dried to form the outer peripheral wall. Heating drying conditions after coating the surface with the coating material can be from 600 to 800° C. and from one to three hours.

As the coating material, it is possible to use a mixture of an inorganic fiber, colloidal silica, clay, SiC particles, an organic binder, a resin balloon, a dispersant, water and the like, or the like. Moreover, there is not any special restriction on a coating method with the coating material, and an example of the coating method is a coating method by a scraper or the like while rotating the surface on a potter's lathe.

A thickness of the coating material can suitably be set, for example, in a range of 0.1 to 1.5 mm.

EXAMPLES

Hereinafter, the present invention will specifically be described with respect to examples, but the present invention is not limited to these examples.

Example 1

Preparation of Honeycomb Segment

As ceramic raw materials, SiC powder and metal Si powder were mixed at a mass ratio of 80:20. To this mixture, methylcellulose and hydroxypropoxyl methylcellulose as forming auxiliaries, starch and a water-absorbing resin as pore formers, a surfactant and water were added, and kneaded, to prepare a kneaded material having a plasticity by a vacuum clay kneader.

The obtained kneaded material was extruded by using an extruder, and dried by microwaves and hot air, to form a formed honeycomb body having porous partition walls with which a plurality of cells to become through channels of a fluid were formed, and an outer peripheral wall positioned at the outermost periphery. The obtained formed honeycomb body was subjected to high-frequency dielectric heating drying, and then dried at 120° C. for two hours by use of a hot air drier, to cut both end surfaces as much as a predetermined amount.

The obtained formed honeycomb body was dried at 120° C. for five hours by use of the hot air drier. Afterward, degreasing was performed at about 450° C. in the atmospheric air for five hours by use of an atmospheric air furnace with a deodorizing device. Afterward, firing was performed at about 1450° C. in an Ar inert atmosphere for five hours, to obtain a porous fired honeycomb body in which SiC crystal particles were bound by Si. An average pore diameter of the fired honeycomb body was 14 μm, and a porosity was 42%. The average pore diameter and porosity were values measured by a mercury porosimeter.

In the obtained fired honeycomb body, plugged portions were formed in one end portion of each of predetermined cells and the other end portion of each of the remaining cells. Additionally, the predetermined cells and the remaining cells were alternately (interchangeably) arranged, and in both the end surfaces of the body, checkered patterns were formed by open frontal areas of the cells and the plugged portions. As a charging material for plugging, a material similar to that of the formed honeycomb body was used. After forming the plugged portions in the fired honeycomb body, the fired honeycomb body was fired on the same conditions as the above firing conditions, to obtain a honeycomb segment.

In this way, 16 honeycomb segments were prepared. In each of the honeycomb segments, a shape of a bottom surface was square, an outer diameter (length×breadth) of this bottom surface was 36 mm×36 mm, and a length in a central axis direction was 152 mm.

Moreover, a partition wall thickness of the obtained honeycomb segment was 310 μm. Furthermore, a cell density was about 46.5 cells/cm² (300 cells/square inch).

(Preparation of Joining Material Composition)

As an aggregate, 65 parts by mass of silicon carbide (an average particle diameter of 4 μm and an aspect ratio of 1 to 3) were used, and as a pore former, 5 parts by mass of a resin balloon (an average particle diameter of 45 μm and an aspect ratio of 1 to 1.2) were used. Additionally, in the above aggregate, a volume content ratio of particles having particle diameters of 50 μm or less was 89%, a volume content ratio of particles having particle diameters of 10 μm or less was 78%, and a volume content ratio of particles having particle diameters of 2 μm or less was 18%. Furthermore, the above aggregate and pore former were mixed with the following materials to be added. That is, there were mixed 20 parts by mass of colloidal silica (an inorganic binder), 0.5 part by mass of carboxymethylcellulose (CMC) (an organic binder), 5 parts by mass of aluminosilicate fiber (an inorganic fiber), 0.1 part by mass of polyethylene glycol oleate (a dispersant), and water. Afterward, the materials were kneaded for 30 minutes by a mixer to obtain a paste-like joining material composition. At this time, an amount of the water to be added was regulated so that a viscosity of the paste-like joining material composition was from 20 to 60 Pa·s.

(Preparation of Honeycomb Structure)

Side surfaces of the honeycomb segment were coated with the joining material composition so that coated layers having a thickness of 1 mm were formed. At this time, a coating direction was along a longitudinal direction of the honeycomb segment. Next, on this honeycomb segment, the other honeycomb segment was mounted so that the above coated layer came in contact with an outer wall surface. Afterward, this step was repeated, to prepare a honeycomb segment laminate constituted of 16 honeycomb segments in total as a combination of four vertical segments×four horizontal segments. Afterward, a pressure was applied from the outside, and then the laminate was dried at 140° C. for two hours, to obtain a joined segment assembly. An outer peripheral portion of the obtained joined segment assembly was ground so that the whole outer peripheral portion was columnar. Afterward, an outer peripheral surface was coated with a coating material, and dried at 700° C. for two hours, to form an outer peripheral wall (a thickness of 0.3 mm). In this way, a honeycomb structure body was obtained. Additionally, there was used the coating material obtained by adding additives such as an organic binder, a resin balloon and a dispersant to inorganic raw materials such as an inorganic fiber, colloidal silica, a clay and SiC particles, further adding water and kneading the materials. A diameter of a round bottom surface of the obtained honeycomb structure body was 144 mm.

Blending of the joining material composition is shown in Table 1 and Table 2.

(Evaluation of Joining Material Layer)

A porosity, an average diameter of spherical pores, a value of P2/P1, a compressive Young's modulus and a bending strength of a joining material layer of the obtained honeycomb structure body were obtained by the following methods. The results are shown in Table 3.

[Porosity]

A part of the joining material layer was cut from the honeycomb structure body to obtain a test piece. The porosity of this test piece was calculated by Archimedes method. Additionally, porosities of three layers (a first layer, a second layer and a third layer) constituting the joining material layer were calculated by image processing described later. The above test piece had a dimension of vertical 10 mm×horizontal 10 mm, and a thickness of the test piece was the same (1 mm) as a thickness of the joining material layer. That is, one surface of the above test piece originates from one surface of the joining material layer (the surface on the side of one honeycomb segment). Moreover, the other surface originates from the other surface of the joining material layer (the surface on the side of the other honeycomb segment).

[Ratio of Spherical Pores]

First, an electron microphotograph of a cross section of the joining material layer which was perpendicular to a thickness direction was subjected to image processing, and the number of all "pores" in an observation view field (1.0 mm$^2$) was counted. Next, among these "pores", the number of the pores (spherical pores) having a "maximum diameter/minimum diameter" value of 1.2 or less was counted. Afterward, a ratio of the number of the spherical pores in the number of all "the pores" ((the number of the spherical pores/the number of all "the pores")×100) was calculated. Moreover, this operation was performed for ten view fields selected at random, and an average value of these fields was calculated, to obtain a ratio (%) of the spherical pores. Moreover, the respective view fields were prevented from being overlapped. Furthermore, a pore having an area smaller than 50 μm$^2$ in the cross section of the joining material layer which was perpendicular to the thickness direction was not included in "the pores".

[Average Diameter of Spherical Pores]

An average diameter ((the maximum diameter+the minimum diameter)/2) of 159 "spherical pores" in the observation view field (1.0 mm$^2$) was calculated, to obtain the average diameter of the spherical pores.

[Microstructure Observation]

One honeycomb segment among 16 honeycomb segments was defined as a honeycomb segment A. The other honeycomb segment adjacent to the honeycomb segment A was defined as a honeycomb segment B. Then, a test piece (10 mm×15 mm×70 mm) constituted of the honeycomb segment A, the honeycomb segment B and a joining material layer 13 was cut from the honeycomb structure body. Specifically, there was cut out the test piece constituted of the honeycomb segment A of 10 mm×15 mm×34.5 mm, the honeycomb segment B of 10 mm×15 mm×34.5 mm and the joining material layer 13 of 10 mm×15 mm×1 mm joining these segments. As shown in FIG. 3, this joining material layer of the test piece was divided into three layers constituted of a first layer R1, a second layer R2 and a third layer R3 at a thickness ratio of 1:2:1 in order from the side of the honeycomb segment A. Then, each of the porosities of the respective layers was calculated by the image processing. Afterward, an average porosity P1 of the first layer R1 and the third layer R3 and a porosity P2 of the second layer R2 were obtained, to calculate a value of P2/P1. The present evaluation is shown as "the value of P2/P1" in Table 2.

The calculation of the porosities of the respective layers (the first layer R1, the second layer R2 and the third layer R3) by the image processing was specifically performed as follows. First, an image of the joining material layer of the test piece by a scanning type electron microscope (SEM) (the SEM image and a magnification of 200 to 250 times) was binarized by using image analysis software (Win ROOF manufactured by MITANI Corporation). The binarization was performed so that a pore portion turned black and a portion other than the pores turned white. After the binarization, an area of the portion (the white portion) other than the pores was calculated. Afterward, a ratio (%) of the portion (the white portion) other than the pores to the area of the whole SEM image (the total area of the black and white portions in the SEM image was calculated), to obtain the porosity. In this way, the porosities of the first layer R1, the second layer R2 and the third layer R3 were calculated.

[Compressive Young's Modulus of Joining Material Layer in Thickness Direction]

The joining material layer was cut from the honeycomb structure body to obtain a test piece, a predetermined compressive load (specifically, 2 MPa) was applied to this test piece, and displacements before and after the application of the compressive load were measured to prepare "a stress-strain diagram". Then, the modulus was calculated from "the stress-strain diagram". The above test piece had a dimension of vertical 10 mm×horizontal 10 mm, and a thickness of the test piece was the same (1 mm) as the thickness of the joining material layer. That is, one surface of the above test piece originates from the one surface of the joining material layer (the surface on the side of the one honeycomb segment). Moreover, the other surface originates from the other surface of the joining material layer (the surface on the side of the other honeycomb segment).

[Bending Strength]

The bending strength was measured by a four-point bending test in conformity to a joining bending test of JIS R 1624. Specifically, as shown in FIG. 6, one honeycomb segment among the plurality of honeycomb segments was first defined as a honeycomb segment X. The other honeycomb segment adjacent to the honeycomb segment X was defined as a honeycomb segment Y. Then, a test piece (10 mm×15 mm×70 mm) constituted of the honeycomb segment X, the honeycomb segment Y and a joining material layer 13 was cut from the honeycomb structure body. Specifically, there was cut out the test piece constituted of the honeycomb segment X of 10 mm×15 mm×34.5 mm, the honeycomb segment Y of 10 mm×15 mm×34.5 mm and the joining material layer 13 of 10 mm×15 mm×1 mm joining these segments. Next, as shown in FIG. 7, the test piece was disposed so that a length $L_1$ between two supporting points 16 and 16 was 60 mm and a length $L_2$ between two loading points 18 and 18 was 20 mm. Next, external forces were applied to the loading points. The test was carried out as described above to measure "the bending strength". The present evaluation is shown as "the bending strength" in Table 2. It is to be noted that in FIG. 6 and FIG. 7, a direction along a cell extending direction is shown by a character N.

TABLE 1

| | Joining material composition | | | | | | | |
|---|---|---|---|---|---|---|---|---|
| | Aggregate | | | Pore former | | | Inorganic binder | |
| | Type | Blend amount | Ratio (%) | Type | Blend amoun | Ratio (%) | Type | Blend amount |
| Example 1 | Silicon carbide | 65 | 100 | Resin balloon | 5 | 100 | Colloidal silica | 20 |
| Example 2 | Silicon carbide | 70 | 100 | Resin balloon | 5 | 100 | Colloidal silica | 20 |
| Example 3 | Silicon carbide/ cordierite | 35/35 | 100 | Resin balloon | 5 | 100 | Colloidal silica | 20 |
| Example 4 | Silicon carbide/ cordierite | 34/34 | 100 | Resin balloon | 7 | 100 | Colloidal silica | 20 |
| Example 5 | Silicon carbide | 70 | 100 | Resin balloon | 3.5 | 100 | Colloidal silica | 21.5 |
| Example 6 | Silicon carbide | 60 | 100 | Resin balloon | 6 | 100 | Colloidal silica | 20 |
| Example 7 | Silicon carbide | 68 | 100 | Resin balloon | 7 | 100 | Colloidal silica | 20 |
| Example 8 | Silicon carbide | 71.5 | 100 | Resin balloon | 3.5 | 100 | Colloidal silica | 20 |
| Example 9 | Silicon carbide | 67 | 100 | Resin balloon | 8 | 100 | Colloidal silica | 20 |
| Comparative Example 1 | Silicon carbide | 73.5 | 80 | Resin balloon | 1.5 | 100 | Colloidal silica | 20 |
| Comparative Example 2 | Silicon carbide | 42 | 100 | Resin balloon | 1 | 50 | Colloidal silica | 20 |
| Comparative Example 3 | Silicon carbide | 35 | 100 | Resin balloon | 1 | 100 | Colloidal silica | 20 |
| Comparative Example 4 | Silicon carbide | 50 | 100 | Resin balloon | 7 | 50 | Colloidal silica | 20 |

| | Joining material composition | | | | | |
|---|---|---|---|---|---|---|
| | Organic binder | | Inorganic fiber | | Dispersant | |
| | Type | Blend amount | Type | Blend amount | Type | Blend amount |
| Example 1 | CMC | 0.5 | Aluminosilicate fiber | 5 | Polyethylene glycol oleate | 0.1 |
| Example 2 | CMC | 0.5 | — | 0 | Polyethylene glycol oleate | 0.1 |
| Example 3 | CMC | 0.5 | — | 0 | Polyethylene glycol oleate | 0.1 |
| Example 4 | CMC | 0.5 | — | 0 | Polyethylene glycol oleate | 0.1 |
| Example 5 | CMC | 0.5 | — | 0 | Polyethylene glycol oleate | 0.1 |
| Example 6 | CMC | 0.5 | Aluminosilicate fiber | 9 | Polyethylene glycol oleate | 0.1 |
| Example 7 | CMC | 0.5 | — | 0 | Polyethylene glycol oleate | 0.1 |

TABLE 1-continued

|  |  |  |  |  |  |  |  |
|---|---|---|---|---|---|---|---|
| Example 8 | CMC | 0.5 | — | 0 | Polyethylene glycol oleate | 0.1 |
| Example 9 | CMC | 0.5 | — | 0 | Polyethylene glycol oleate | 0.1 |
| Comparative Example 1 | CMC | 0.5 | — | 0 | Polyethylene glycol oleate | 0.1 |
| Comparative Example 2 | CMC | 0.5 | Aluminosilicate fiber | 34 | Polyethylene glycol oleate | 0.1 |
| Comparative Example 3 | CMC | 0.5 | Aluminosilicate fiber | 25 | Polyethylene glycol oleate | 0.1 |
| Comparative Example 4 | CMC | 0.5 | Aluminosilicate fiber | 20 | Polyethylene glycol oleate | 0.1 |

TABLE 2

| | Joining material composition | | | |
|---|---|---|---|---|
| | Aggregate particle size | | | |
| | 2 μm or less | 10 μm or less | 150 μm or less | Pore former ave. particle dia. (μm) |
| Example 1 | 18 | 78 | 89 | 7 |
| Example 2 | 18 | 78 | 89 | 7 |
| Example 3 | 38 | 78 | 89 | 6 |
| Example 4 | 38 | 78 | 89 | 6 |
| Example 5 | 25 | 60 | 92 | 8 |
| Example 6 | 18 | 78 | 89 | 7 |
| Example 7 | 30 | 70 | 86 | 6 |
| Example 8 | 10 | 40 | 85 | 13 |
| Example 9 | 40 | 85 | 95 | 3 |
| Comparative Example 1 | 50 | 88 | 93 | 2 |
| Comparative Example 2 | 45 | 90 | 99 | 3 |
| Comparative Example 3 | 28 | 90 | 99 | 4 |
| Comparative Example 4 | 30 | 90 | 99 | 4 |

[Evaluation of Honeycomb Structure Body]

[Burner Spalling Test (Rapid Heating Test)]

The obtained honeycomb structure body was subjected to a rapid heating test (a burner spalling test) sequentially at test temperatures of 900° C., 1000° C. and 1100° C. by a method described hereinafter. Then, a generating situation of cracks in the honeycomb structure body subjected to the test was observed. The result is shown in Table 3.

In the present test, air heated by a burner was allowed to flow through the honeycomb structure body to make a temperature difference between a center portion and an outside portion, and a heat shock resistance was evaluated in accordance with a temperature at which any cracks were not generated in the honeycomb structure body (the heat shock resistance was high as the temperature was high). Evaluation standards were as follows. A case where the cracks were generated at the test temperature of 900° C. was evaluated as "D". A case where any cracks were not generated at the test temperature of 900° C. but the cracks were generated at the test temperature of 1000° C. was evaluated as "C". A case where any cracks were not generated at the test temperature of 1000° C. but the cracks were generated at the test temperature of 1100° C. was evaluated as "B". A case where any cracks were not generated even at the test temperature of 1100° C. was evaluated as "A".

TABLE 3

| | Joining material layer | | | | | | | | | | |
|---|---|---|---|---|---|---|---|---|---|---|---|
| | Ave. pore dia. (μm) | Spherical pore ave. dia. (μm) | No. of all pores (Pores/mm²) | No. of spherical pores per unit (Pores/mm²) | Number ratio (%) | Porosity (%) | Value of P2/P1 | Compressive Young's modulus (MPa) | Bending strength (MPa) | Rapid heating test | Repeated rapid heating test |
| Example 1 | 30 | 35 | 192 | 159 | 83 | 63 | 1.11 | 30 | 1.6 | A | A |
| Example 2 | 26 | 32 | 179 | 146 | 82 | 63 | 0.96 | 32 | 1.5 | A | A |
| Example 3 | 35 | 40 | 177 | 154 | 87 | 60 | 1.03 | 35 | 1.7 | A | A |
| Example 4 | 41 | 45 | 172 | 137 | 80 | 67 | 1.17 | 23 | 1.3 | A | B |
| Example 5 | 20 | 31 | 212 | 163 | 77 | 52 | 1.18 | 58 | 2.4 | B | A |
| Example 6 | 47 | 52 | 148 | 105 | 71 | 66 | 1.22 | 18 | 0.9 | B | B |
| Example 7 | 18 | 27 | 276 | 185 | 67 | 48 | 0.88 | 72 | 2.6 | C | B |
| Example 8 | 52 | 58 | 113 | 73 | 65 | 73 | 1.16 | 14 | 0.6 | B | C |
| Example 9 | 22 | 23 | 332 | 202 | 61 | 42 | 0.93 | 83 | 3.2 | C | C |
| Comparative Example 1 | 18 | 20 | 123 | 64 | 52 | 37 | 1.18 | 142 | 2.1 | D | C |
| Comparative Example 2 | 28 | 33 | 55 | 31 | 56 | 33 | 1.30 | 200 | 2.3 | D | B |
| Comparative Example 3 | 58 | 32 | 90 | 43 | 48 | 59 | 2.10 | 21 | 0.9 | B | D |
| Comparative Example 4 | 75 | 63 | 126 | 50 | 40 | 78 | 1.54 | 10 | 0.4 | C | D |

[Repeated Burner Spalling Test (Repeated Rapid Heating Test)]

A test temperature was set to 800° C., and the above rapid heating test (the burner spalling test) was repeatedly carried out a plurality of times. Specifically, air (800° C.) heated by the burner was allowed to flow through the honeycomb structure body to make a temperature difference between the center portion and the outside portion. Afterward, the air was cooled down to room temperature (about 25° C.), and the air (800° C.) heated by the burner was allowed to flow through the honeycomb structure body again. This operation was repeatedly performed. Then, a generating situation of the cracks in the honeycomb structure body subjected to the test was observed. Evaluation standards were as follows. A case where the cracks were generated by the tests repeated less than five times was evaluated as "D". A case where the cracks were generated by the tests repeated five times or more and less than ten times was evaluated as "C". A case where the cracks were generated by the tests repeated ten times or more and less than 20 times was evaluated as "B". A case where the cracks were not generated even by the tests repeated 20 times was evaluated as "A". The result is shown in Table 3.

It is to be noted that when the "D" evaluation is present in [the burner spalling test (the rapid heating test)] or [the repeated burner spalling test (the repeated rapid heating test)], the cracks might be generated at regeneration of a filter. Therefore, when the "D" evaluation is present in one of the tests, it can be judged that the honeycomb structure body does not have an excellent heat shock resistance.

Examples 2 to 9 and Comparative Examples 1 to 4

The procedures of Example 1 were repeated except that joining material compositions shown in Table 1 and Table 2 were used, to prepare honeycomb structure bodies (Examples 2 to 9 and Comparative Examples 1 to 4). Afterward, the prepared honeycomb structure bodies (Examples 2 to 9 and Comparative Examples 1 to 4) were subjected to evaluations and tests similar to those of Example 1, respectively. The results are shown in Table 3.

As apparent from Table 3, it can be confirmed that the honeycomb structure bodies of Examples 1 to 9 have joining material layers of a stress relaxing function and joining strength equivalent to those of joining material layers of a conventional honeycomb structure body, and have an excellent heat shock resistance, as compared with the honeycomb structure bodies of Comparative Examples 1 to 4.

INDUSTRIAL APPLICABILITY

A honeycomb structure body of the present invention can be utilized, for example, as a diesel particulate filter (DPF) for trapping and removing a particulate matter (particulates) included in an exhaust gas from a diesel engine or the like.

DESCRIPTION OF REFERENCE NUMERALS

1: cell, 2: partition wall, 3: outer peripheral wall, 4: honeycomb segment, 6: plugged portion, 8: pore, 9: line segment, 10: spherical pore, 11: one end surface, 12: other end surface, 13: joining material layer, 15a and 15b: cavity, 16: supporting point, 18: loading point, R1: first layer, R2: second layer, R3: third layer, and 100: honeycomb structure body.

The invention claimed is:

1. A honeycomb structure body comprising:
a plurality of honeycomb segments having porous partition walls with which a plurality of cells extending from one end surface to the other end surface to become through channels of a fluid are formed, and an outer peripheral wall positioned at the outermost periphery and disposed to surround the partition walls, and having plugged portions arranged in one end portion of each of predetermined cells and the other end portion of each of the remaining cells; and joining material layers having a plurality of pores and joining the plurality of honeycomb segments in a state where the honeycomb segments are arranged adjacent to each other so that side surfaces of the honeycomb segments face each other, wherein a ratio of a number of pores having a value of 1.2 or less which is obtained by dividing a maximum diameter of each of the pores by a minimum diameter of the each of the pores is 60% or more of the number of all the pores of each of the joining material layers, and wherein the number of all the pores is obtained by counting a total number of pores in a 1.0 mm$^2$ field of view, the counting operation is performed for ten non-overlapping fields of view selected at random, the total number of pores is expressed as the total number of pores in an area, and pores having an area smaller than 50 μm$^2$ are not counted in the total number of pores.

2. The honeycomb structure body according to claim 1, wherein when the one honeycomb segment among the plurality of honeycomb segments is defined as a honeycomb segment A, the other honeycomb segment is defined as a honeycomb segment B and the joining material layer joining the honeycomb segment A and the honeycomb segment B is divided into three layers constituted of a first layer, a second layer and a third layer at a thickness ratio of 1:2:1 in order from the side of the honeycomb segment A, a relation of 0.9<P2/P1<1.2 is satisfied, in which P1 is an average porosity of the first layer and the third layer, and P2 is a porosity of the second layer.

3. The honeycomb structure body according to claim 2, wherein a porosity of the whole joining material layer is from 45 to 75%.

4. The honeycomb structure body according to claim 3, wherein an average pore diameter of the joining material layer is from 20 to 50 μm.

5. The honeycomb structure body according to claim 2, wherein an average pore diameter of the joining material layer is from 20 to 50 μm.

6. The honeycomb structure body according to claim 2, wherein the joining material layer contains at least one selected from a group consisting of silicon carbide, cordierite, alumina, zirconia, and yttria.

7. The honeycomb structure body according to claim 2, wherein a compressive Young's modulus of the joining material layer in a thickness direction is from 15 to 80 MPa, and a bending strength is from 0.8 to 3.0 MPa.

8. The honeycomb structure body according to claim 1, wherein a porosity of the whole joining material layer is from 45 to 75%.

9. The honeycomb structure body according to claim 8, wherein an average pore diameter of the joining material layer is from 20 to 50 μm.

10. The honeycomb structure body according to claim 1, wherein an average pore diameter of the joining material layer is from 20 to 50 μm.

11. The honeycomb structure body according to claim 1, wherein the joining material layer contains at least one selected from a group consisting of silicon carbide, cordierite, alumina, zirconia, and yttria.

12. The honeycomb structure body according to claim 1, wherein a compressive Young's modulus of the joining material layer in a thickness direction is from 15 to 80 MPa, and a bending strength is from 0.8 to 3.0 MPa.

13. The honeycomb structure body according to claim 1, wherein the total number of all pores is from 113 to 332 pores/mm$^2$.

14. The honeycomb structure body according to claim 1, wherein the ratio of the number of pores having a value of 1.2 or less is from 65 to 100%.

15. The honeycomb structure body according to claim 14, wherein the ratio of the number of pores having a value of 1.2 or less is from 70 to 100%.

16. The honeycomb structure body according to claim 15, wherein the ratio of the number of pores having a value of 1.2 or less is from 80 to 100%.

\* \* \* \* \*